3,397,174
Patented Aug. 13, 1968

1

3,397,174
STABILIZING HALOGENATED COPOLYMERS

Paul Thomas Parker and Fred J. Buchmann, Baton Rouge, La., assignors to Esso Research and Engineering Company, a corporation of Delaware No Drawing. Filed Sept. 10, 1964, Ser. No. 395,620
2 Claims. (Cl. 260—45.9)

This invention relates to the stabilization of rubbery polymeric compositions containing partially halogenated highly unsaturated copolymers of isoolefins and multiolefins with minor proportions of certain aliphatic amines.

In accordance with the present invention, it has now been found that while isoolefin-multiolefin copolymers, such as butyl rubber, do not respond to stabilization by aliphatic amines, certain halogenated derivatives of these copolymers are surprisingly improved by these stabilizing compounds as to decreased gelation during drying, milling and/or extruding steps.

Copolymers of the general type covered by the composition and process of the present invention comprise a major proportion (preferably about 85 to 99.5 wt. percent) of a $C_4$ to $C_6$ isoolefin such as isobutylene, 2-methyl butene-1, or 3-methyl butene-1, etc. with a minor proportion (preferably about 15 to 0.5 wt. percent) of a multiolefin of about 4 to 14, preferably about 4 to 6 carbon atoms. These are commonly referred to in patents and in technical literature as "butyl rubber" or GR–I rubber (Government rubber—isobutylene) for example in the textbook "Synthetic Rubber" by G. S. Whitby. The preparation of butyl rubber is described in U.S. Patent No. 2,356,128 to Thomas et al. The multiolefinic component of the copolymer is preferably a conjugated diolefin such as isoprene, butadiene, dimethyl butadiene, piperylene, myrcene, or such multiolefins as cyclopentadiene, methylcyclopentadiene, cyclohexadiene, dimethyl, alloocimene, vinyl fulvenes, etc. If desired, about 0.05 to 20.0, preferably about 0.2 to 5.0 parts by weight, based on total reacting comonomers, of unsaturated compounds as styrene, p-methyl styrene, alpha-methyl styrene, divinyl benzene, indene, dihydronaphthalene, etc., or mixtures thereof may also be present. These copolymers have Staudinger molecular weights of between about 20,000 and 300,000 and mole percent unsaturations of between about 0.5 and 15.0.

The halogenated rubbery isoolefin-containing copolymers, particularly chlorinated or brominated butyl rubbers, are produced by carefully chlorinating and/or brominating the hydrocarbon copolymers in a manner which does not degrade the molecular weight. The resulting halogenated copolymers do not require sulfur or ultra-accelerators in their vulcanization and may be vulcanized solely by zinc oxide and/or primary or polyfunctional amines.

In order to produce halogenated butyl rubber, the halogenation is regulated so that the resulting rubber will contain at least about 0.5 wt. percent (preferably at least about 1.0 wt. percent) of combined halogen but not more

2 than about "X" wt. percent of combined chlorine or 3.0 "X" wt. percent combined bromine wherein:

$$X=\frac{M_3L}{(100-L)M_1+L(M_2+M_3)}\times 100$$

and $L$=mole percent of the multiolefin in polymer,
$M_1$=molecular weight of the isoolefin,
$M_2$=molecular weight of the multiolefin,
$M_3$=atomic weight of chlorine or bromine.

Suitable halogenating agents which may be employed are gaseous chlorine, liquid bromine, alkali metal hypochlorites, or hypobromites, $C_4$ to $C_{10}$ tertiary alkyl hypochlorites, sulfur bromides, sulfuryl chloride, pyridinium chloride perchloride, N-bromosuccinimide, alpha-chloroaceto - acetanilide, N,N' - dichloro - 5,5 - dimethylhydantoin, iodine halides, trichlorophenol chloride, N-chloroacetamide, etc. The preferred halogenating agents are gaseous chlorine, liquid bromine, sulfuryl chloride, sulfuryl bromide, chlorohydantoins, bromohydantoins, iodine monochloride, and related materials.

The halogenation is generally conducted at temperatures of above about 0° to about 100° C., depending upon the particular halogenating agent, for about one minute to several hours. An advantageous pressure range is from about 0.1 to 1000 p.s.i.a., atmospheric pressure being satisfactory. The halogenation may be accomplished by preparing a 1 to 80 wt. percent solution of such copolymers as described above, in a substantially inert liquid organic solvent such as a $C_3$ to $C_{10}$ substantially inert hydrocarbon or halogenated derivatives of saturated hydrocarbons; e.g. hexane, mineral spirits, cyclohexane, benzene, chlorobenzene, chloroform, carbon tetrachloride, mixtures thereof, etc. and adding thereto the halogenating agent, which may optionally be in solution, such as dissolved in a substantially inert hydrocarbon, an alkyl chloride, carbon tetrachloride, carbon disulfide, etc.

If chlorine gas is employed, it may also be diluted with up to about 50 times its volume, preferably about 0.1 to 5.0 times its volume of a substantially inert gas such as nitrogen, methane, carbon dioxide, etc.

The resulting halogenated isoolefin-multiolefin-containing copolymer may be recovered by precipitation with oxygenated hydrocarbons, particularly alcohols or ketones such as acetone or any other known non-solvent for the halogenated butyl rubber and dried, preferably under about 1 to 760 millimeters or higher of mercury pressure absolute, at about 0° to 180° C., preferably about 50° to 150° C. (e.g. 70° C.). Other methods of recovering the chlorinated polymer are by conventional spray or drum drying techniques. Alternatively, the solution of the halogenated rubber may be injected into a vessel containing steam and/or agitated water heated to a temperature sufficient to volatilize the solvent and form an aqueous slurry of the chlorinated rubber. This halogenated rubber may then be separated from the slurry by filtration and drying or recovered as a "crumb" or as a dense sheet or slab by conventional hot milling and/or extruding procedures. As so produced, the halogenated rubbery copolymer has a Staudinger molecular weight within the range between approximately 20,000 to 300,000, preferably about 25,000 to 200,000, and a mole percent unsaturation of about 0.5 to 15.0, and a combined halogen content of about 0.5 to 10.0 weight percent, preferably about 1.0 to 5.0 weight percent based on rubbery copolymer.

It has been found that halogenated polymers of the type described above and containing more than 0.5 wt. percent chlorine and having more than 1.0 mole percent residual unsaturation self-cure on the mill when heated in the absence of curing agents to temperatures above 200° F. This is indicated by a large increase in gel content and is measured on a standard Mooney machine at 260° F. as the number of minutes required for a 5 point rise in Mooney points. This is known as the gum Mooney scorch time.

In accordance with the present invention this tendency for these halogenated polymers to self-cure is overcome by adding 0.05 to 10 wt. percent of an aliphatic amine to the polymer.

In practicing the present invention, the unvulcanized halogenated isoolefin-multiolefin-containing polymer is blended at a temperature between 0° and 200° C. with about 0.05 to 10 wt. percent based on copolymer of an aliphatic amine selected from the group consisting of n-butylamine, trimethallylamine and diethylamine, etc. Each of these amines improve the stability of the chlorinated polymer but the secondary amines, such as diethylamine are particularly effective.

In order to more fully illustrate the present invention the following experimental data are given.

Example 1

A copolymer prepared from a feed consisting of about 96.6 wt. percent of isobutylene, 3.0 wt. percent methyl cyclopentadiene and 0.4 wt. percent divinyl benzene and having a 3 minute Mooney at 260° F. of 52 and an unsaturation of 3.2 mole percent was dissolved in hexane to form a 15.6 wt. percent solution. This solution was chlorinated by conducting gaseous chlorine at a dosage of 3.0 wt. percent through the cement over a period of ten minutes at 30° C. in a Pfaudler reactor equipped with agitator and baffle. The chlorine was added to the reactor through a 3/8 inch stainless steel tube, one end of which was immersed below the liquid level of the agitated cement. The agitated solution was then allowed to stand in a dark room at room temperature for an additional twenty-four hours in the presence of various aliphatic amines. The resulting solution of chlorinated polymer was then water-washed to remove dissolved hydrogen chloride. The polymer was precipitated with acetone and stabilized with 1.82 wt. percent calcium stearate and 0.2 wt. percent 2,6-ditertiary-4-methyl phenol and divided into several parts for treatment. Each part was mill dried at 240° F. and in some cases eventually cured. The following data were obtained:

| Run No. | 1 | 2 | | 3 | 4 | 5 | 6 |
|---|---|---|---|---|---|---|---|
| Treating Agent | [3] DEA | DEA | | DEA | [3] BA | [3] TMAA | None |
| Wt. percent on polymer | 2.5 | 10 | | 1.0 | 2.6 | 2.6 | |
| Mill Dried Product: | | | | | | | |
| Appearance | OK | OK | | OK | OK | OK | Gelled |
| Unsaturates, mole percent | | Insol. | | 4 | | | |
| Gel, wt. percent | 1.0 | 0.0 | | 1.95 | 0.0 | 0.0 | 38.0 |
| Chlorine, wt. percent | 1.34 | 1.40 | | 1.20 | 1.29 | 1.27 | |
| Mooney, 3 min. at 260° F. | 46 | 40 | | 42 | 46 | 46 | |
| Gum Mooney Scorch [1] at 260° F. | 9 | 9 | | 11 | 6 | 7 | |
| Cure Data: | | | | | | | |
| Type [2] | Sulfur | ZnO | ZnO | S | | | |
| Time at 307° F. | 30 | 20 | 20 | 20 | | | |
| Mooney Scorch, $T_5$ at 260° F. [4] | 1.4 | 5.9 | 10.3 | 3.3 | | | |
| Tensile, p.s.i. | 1,825 | 1,375 | 1,200 | 1,525 | | | |
| Modulus, 300% p.s.i. | 1,580 | 1,240 | 900 | 1,470 | | | |
| Elongation, percent | 350 | 320 | 380 | 380 | | | |

[1] Minutes necessary for the Mooney to rise five Mooney points above the minimum on a gum sample (no curatives added).

[2] Recipe:

| | ZnO | Sulfur |
|---|---|---|
| Polymer | 100 | 100 |
| SRF Black | 50 | 50 |
| Stearic acid | 1 | 1 |
| ZnO | 5 | 5 |
| Tetramethylthiuram disulfide | | 1 |
| Altax | | 1 |
| Sulfur | | 2 |

[3] Cement allowed to stand overnight rather than 24 hours: DEA—Diethylamine; BA—Butylamine; TMAA—Trimethallylamine.

[4] Determined on compound sample.

The above data show that the treatment of the polymer solution with the amine prevents the scorching of the raw rubber on the hot mill with no essential loss of chlorine. In contrast the untreated polymer cured on the mill during the drying step. The data also show that, while all the amines are effective, the secondary amine, diethylamine, is relatively more effective.

Example 2

A chlorinated copolymer was prepared as described in Example 1, but this time from a feed consisting of 1.5 wt. percent of methyl cyclopentadine, 0.2 wt. percent of divinyl benzene and 98.3 wt. percent of isobutylene. The chlorine dosage was 3.5 wt. percent and the unchlorinated polymer had a mole percent unsaturation of 1.69 and a three minute Mooney at 260° F. of 60. To the polymer solution was added various amounts of diethylamine and the mixture allowed to stand as indicated. The following results were obtained:

| Run No. | 7 | | 8 | | 9 |
|---|---|---|---|---|---|
| Treating Agent | | DEA | | DEA | DEA |
| Wt. percent on polymer | | 2.4 | | 2.4 | 2.3 |
| Conditions | | A | | A | B |
| Mill Dried Product (240° F.): | | | | | |
| Appearance | | OK | | OK | OK |
| Unsat. (mole percent) | | 2.35 | | 3.26 | |
| Gel (wt. percent) | | 0.0 | | 0.0 | 2.35 |
| Chlorine (wt. percent) | | 1.10 | | 0.89 | |
| Mooney, 3 min. at 260° F. | | 39 | | 33 | 42 |
| Gum Mooney Scorch at 260° F. | | 20+ | | 20+ | 20 |
| Cure Data: [2] | | | | | |
| Type cure | ZnO | S | ZnO | S | ZnO |
| Time at 307° F. | 20 | 20 | 20 | 20 | 20 |
| Mooney Scorch, $T_5$ at 260° F. [3] | 13.1 | 4.5 | 13.5 | 4.8 | 14.3 |
| Tensile, p.s.i. | 1,200 | 1,800 | 1,075 | 1,900 | 1,075 |
| Modulus, 300% p.s.i. | 630 | 650 | 670 | 800 | 540 |
| Elongation, percent | 460 | 610 | 420 | 590 | 550 |

[1] Minutes necessary for the Mooney to rise 5 points above the minimum on a gum sample (no curatives added).

[2] Recipe: (same as footnote 2 in Example 1.)

[3] Mooney Scorch on compounded sample.

A=Cement allowed to stand at room temperature overnight in presence of treating agent.

B=Cement allowed to stand 24 hours at room temperature in presence of treating agent.

DEA=Diethylamine.

Example 3

A butyl rubber prepared from a major proportion of isobutylene and a minor proportion of isoprene and having 3.4 mole percent unsaturation and a Mooney viscosity of 53 at 212° F. was chlorinated in hexane solution to give products containing varying amounts of chlorine. The chlorinated products were worked up as in Example 1 and dried on the mill at 240° F. with and without the addition of diethylamine and the following results were obtained:

| Run No | 10 | 11 | 12 | 13 | 14 |
|---|---|---|---|---|---|
| $Cl_2$ Dosage, wt. percent | 3.2 | 5.25 | 5.25 | 5.25 | 5.25 |
| $Cl_2$ in Rubber, wt. percent | 1.5 | 2.10 | 2.10 | 2.00 | 1.70 |
| Stabilized with— | | | | | |
| Ca Stearate, wt. percent | 1.82 | 1.82 | 1.82 | 1.82 | 1.82 |
| 2,6-di-t-butyl 4-methyl phenol | 0.2 | 0.2 | 0.2 | 0.2 | 0.2 |
| Diethylamine, wt. percent | None | None | None | 0.45 | [1] 0.2 |
| Mill Dried at 240° F.: | | | | | |
| Appearance | OK | Cured | [2] | OK | OK |
| Wt. percent Volatile | 0.6 | | 1.8 | 0.8 | 0.5 |
| ZnO Cure (20′ at 307° F.): | | | | | |
| Mooney Scorch [3] | 11.6 | | | 12.6 | 7.5 |
| Tensile, p.s.i. | 1,700 | | 1,325 | 1,525 | 1,525 |
| Elongation, percent | 340 | | 150 | 290 | 310 |
| Modulus, p.s.i. at— | | | | | |
| 100% | | | 710 | 420 | |
| 200% | | | | 980 | |
| 300% | 1,450 | | | | 1,500 |

[1] Cement stood 5 days after adding DEA before precipitation.
[2] Started to cure on the mill.
[3] Minutes necessary for the Mooney to rise 5 Mooney points above the minimum on the compounded sample.

The above data show that all of the above chlorinated products overcured under the conditions used, but that the addition of diethylamine resulted in a Mooney scorch at the 2.0 wt. percent chlorine level (the more readily scorched product) equivalent to that of the less reactive 1.5 wt. percent chlorine level.

Example 4

The experiment of Example 3 was repeated except that each batch of chlorinated polymer solution was divided into two parts, one stabilized with calcium stearate, but omitted in the other. Diethylamine was added to each portion about ten to fifteen minutes before acetone precipitation. The following data were obtained:

| Run No | 15 | 16 | 17 | 18 |
|---|---|---|---|---|
| $Cl_2$ Dosage, wt. percent | 5.25 | 5.25 | 5.25 | 5.25 |
| $Cl_2$ in Rubber, wt. percent | 2.07 | 2.30 | 2.10 | 2.10 |
| Stabilized with— | | | | |
| Ca Stearate, wt. percent | 1.82 | None | 1.82 | None |
| 2,6-di-t-butyl-4-methyl phenol | 0.2 | 0.2 | 0.2 | 0.2 |
| Diethylamine, wt. percent | 0.2 | 0.2 | 0.2 | 0.2 |
| Mill Dried at 240° F.: Volatile, wt. percent | 0.2 | 0.4 | 0.2 | 0.2 |
| ZnO Cure (20′ at 307° F.): | | | | |
| Mooney Scorch on compounded sample [1] | 2.6 | 12.5 | 8.8 | 2.9 |
| Tensile, p.s.i. | 1,625 | 1,450 | 1,500 | 1,675 |
| Elongation, percent | 230 | 290 | 290 | 270 |
| Modulus, p.s.i.: | | | | |
| 100% | 420 | 402 | 390 | 500 |
| 200% | 1,260 | 1,120 | 1,030 | 1,280 |

[1] At 260° F.

The above data indicate that the diethylamine can supplant calcium stearate as a stabilizer for the polymer and does not preceptibly affect the cure.

Example 5

A copolymer was prepared from a feed containing 0.9 wt. percent of methylcyclopentadine and 99.1 wt. percent isobutylene and chlorinated and worked up as in Example 1. The unchlorinated polymer had a three minute Mooney at 260° F. of 62 and possessed a mole percent unsaturation of 1.8. The chlorinated polymer contained 0.96 wt. percent chlorine. When the chlorinated polymer was dried on the mill at 240° F. it cured and the cured product was found to contain 28.6 wt. percent gel.

A similar polymer having a three minute Mooney at 260° F. of 44 and 2.5 mole percent unsaturation also cured on the mill under the same conditions and was found to contain 11.6 wt. percent gel.

Example 6

Three samples of a chlorinated product of a copolymer prepared from a feed consisting of 4 wt. percent methylcyclopentadiene, 0.5 wt. percent divinyl benzene and 95.5 wt. percent isobutylene, and having a Mooney of 50 at 212° F. and 5.5. wt. percent unsaturation were dried carefully on a mill at less than 200° F., then tested in a Mooney machine at 212° F. The following data were obtained:

| Sample | $Cl_2$ Dosage | $Cl_2$ in Polymer | Mooney | Mooney Scorch, min. |
|---|---|---|---|---|
| 1 | 2.0 | 1.3 | 38 | 10 |
| 2 | 3.5 | 1.8 | [1] | 2 |
| 3 | 7.0 | 2.5 | [1] | 3 |

[1] Scorched.

The data in Examples 5 and 6 show that high chlorine and/or high unsaturation chlorinated polymers are very scorchy in the gum state when heated above 200° F. The data in Examples 1 to 4 show that the addition of aliphatic amines to the chlorinated polymer overcome this difficulty.

The advantages of the present invention having thus been fully set forth and specific examples of the same given, what is claimed as new and useful and desired to be secured by Letters Patent is:

1. A process for stabilizing while heating above 200° F. in the absence of other curing agents, a halogenated copolymer of a major proportion of isobutylene and a minor proportion of an unsaturated hydrocarbon chosen from the group consisting of butadiene, isoprene, methylcyclopentadiene, and divinyl benzene and mixtures thereof and having a halogen content of at least 0.5 wt. percent and a mole percent unsaturation of at least 1.0 which comprises adding to said halogenated copolymer prior to said heating 0.05 to 10 wt. percent of an aliphatic amine chosen from the group consisting of n-butylamine, diethylamine and trimethyllylamine.

2. In a method for mill drying a halogenated polymer crumb consisting of a copolymer of a major proportion of isobutylene and a minor proportion of an unsaturated hydrocarbon chosen from the group consisting of butadiene, isoprene, methylcyclopentadiene, divinyl benzene and mixtures thereof, and having a halogen content of at least 0.5 wt. percent and a mole percent unsaturation of at least 1.0 the improvement which consists in carrying out said mill drying in the presence of 0.05 to 10 wt. percent of an aliphatic amine chosen from the group consisting of n-butylamine, diethylamine and trimethallylamine in the absence of other curing agents.

References Cited

UNITED STATES PATENTS

| | | | |
|---|---|---|---|
| 2,964,493 | 12/1960 | Hakala et al. | 260—45.9 |
| 2,829,121 | 4/1958 | Leeper | 260—45.9 |
| 2,582,670 | 1/1952 | Beaver | 260—798 |

FOREIGN PATENTS

| | | |
|---|---|---|
| 815,939 | 7/1959 | Great Britain. |

DONALD E. CZAJA, *Primary Examiner.*

H. E. TAYLOR, *Assistant Examiner.*